United States Patent [19]

Schneider et al.

[11] Patent Number: 4,613,584

[45] Date of Patent: Sep. 23, 1986

[54] CATALYST FOR THE PRODUCTION OF SYNTHESIS GAS OR HYDROGEN AND PROCESS FOR THE PRODUCTION OF THE CATALYST

[75] Inventors: Michael Schneider, Ottobrunn-Riemerling; Karel Kochloefl, Moosburg; Ortwin Bock, Landshut, all of Fed. Rep. of Germany

[73] Assignee: Süd-Chemie Aktiengesellschaft, Munich, Fed. Rep. of Germany

[21] Appl. No.: 665,757

[22] Filed: Oct. 29, 1984

[30] Foreign Application Priority Data

Nov. 9, 1983 [DE] Fed. Rep. of Germany ....... 3340569

[51] Int. Cl.$^4$ .......................... B01J 21/06; B01J 23/10; B01J 23/64
[52] U.S. Cl. ................................ 502/304; 502/242; 502/250; 502/306; 502/309; 252/373; 423/415 A; 423/648 R
[58] Field of Search ............... 502/304, 328, 339, 334, 502/309, 325, 332, 333, 242, 250, 306; 252/373; 423/415 A, 648 R

[56] References Cited

U.S. PATENT DOCUMENTS

| | | | |
|---|---|---|---|
| 3,186,797 | 6/1965 | Pearce et al. | 502/74 X |
| 3,257,163 | 6/1966 | Stiles | 423/213.5 |
| 3,288,704 | 11/1966 | O'Hara et al. | 208/254 H |
| 3,931,053 | 1/1976 | Kazakov et al. | 502/328 |
| 3,947,381 | 3/1976 | Campbell et al. | 502/258 |
| 4,175,115 | 11/1979 | Ball et al. | 423/648 R |
| 4,299,734 | 11/1981 | Fujitani et al. | 502/304 |
| 4,350,613 | 9/1982 | Nishino et al. | 502/309 X |
| 4,499,205 | 2/1985 | Masuda | 502/333 X |

*Primary Examiner*—W. J. Shine
*Attorney, Agent, or Firm*—William R. Price

[57] ABSTRACT

A catalyst for the production of synthesis gas or hydrogen from aqueous methanol by dissociation or steam reforming. The catalyst contains:

(A) a metal component of one or more elements of the VIIIb group of the periodic table on a carrier material on the basis:

(B$_1$) of TiO$_2$ or CeO$_2$, singly or in admixture with other heat-resistant metal oxides and/or binders or (B$_2$) of TiO$_2$, which is introduced onto the surface of a preformed, heat-resistant carrier.

Processes utilizing this catalyst allow for the dissociation of methanol for production of synthesis gas, or for the production of hydrogen through steam reforming.

Thus, the concentration of hydrogen or of carbon monoxide may be controlled by monitoring the concentration of steam utilized in the inlet feed.

11 Claims, No Drawings

CATALYST FOR THE PRODUCTION OF SYNTHESIS GAS OR HYDROGEN AND PROCESS FOR THE PRODUCTION OF THE CATALYST

FIELD OF THE INVENTION

This invention pertains to the production of hydrogen-rich gas mixtures from methanol. More specifically, this invention relates to an improved catalyst which may be used in the production of synthesis gas through the dissociation of methanol or in the steam reforming reaction for production of hydrogen.

Still more specifically, this invention relates to a process in which one reaction may be guided to predominate over the other by adjusting the amount of steam admitted with the methanol into the reactor, but without changing the catalyst in the reactor. Still more specifically, this invention relates to a catalyst which does not promote the deposition of coke even at low steam concentrations.

BACKGROUND OF THE INVENTION

In the last few years, methanol dissociation has been devoted a growing attention. The synthesis gas, composed of about 33 vol.% CO and 66 vol.% $H_2$, can be obtained according to equation (1).

$$CH_3OH \rightleftharpoons CO + 2H_2 \quad (1)$$

Reaction (1) is highly endothermic and can be carried out at temperatures over 200° C. under atmospheric or lower methanol pressure with the help of certain heterogeneous catalysts. Thus, Inui, et al, J. Japan Petrol., Inst. 25, 121 (1982), investigated the effect of Ni—, Rh—, or Ru— on $SiO_2$— catalyst in comparison to the commercial ZnO—$Cr_2O_3$— methanol synthesis catalysts. The best results were obtained with Ni—Ru-on-$La_2O_3$ or on-$SiO_2$. This catalyst was far superior to the commercial ZnO—$Cr_2O_3$— catalyst. However, with an increase of methanol conversion (over 30%), coke was laid down on the catalyst according to equations (2) and (3).

$$2CH_3OH \rightarrow C + CO_2 + 4H_2 \quad (2)$$

$$CH_3OH \rightarrow C + H_2 + H_2O \quad (3)$$

Another industrially interesting reaction is the methanol steam reforming reaction, which follows equation (4) and leads to a gas mixture of 25 vol.% $CO_2$ and 75 vol.% $H_2$.

$$CH_3OH + H_2O \rightleftharpoons CO_2 + 3H_2 \quad (4)$$

This endothermic reaction can be considered as a combination of methanol dissociation (1) and CO-water gas shift according to equation 5.

$$CO + H_2O \rightleftharpoons CO_2 + H_2 \quad (5)$$

DESCRIPTION OF THE PRIOR ART

Methanol reforming has, up till now, commanded a greater interest than the methanol dissociation. In order to accelerate the reaction of the methanol with steam, Cu-containing catalysts, preferably on $Al_2O_3$, $SiO_2$, or $Al_2O_3$—$SiO_2$, were used (T. Inui, et al, J. Japan Petrol. Inst. 25, 63 (1982), K. Takahashi, et al, Appl. Catal. 2, 363 (1982)).

For the simultaneous methanol dissociation and methanol reforming, Co-, Ni-, Fe-, and precious metal catalysts on $Al_2O_3$ are recommended as well as copper catalysts (J. Fuel Soc. Japan 59, 40 (1980)). These catalysts have, however, only a proportionally low thermal stability and tend to promote coke lay down, corresponding to equations (2) and (3), especially if the water content of the methanol is low.

SUMMARY OF THE INVENTION

The invention is based on the problem of creating a catalyst that is equally good under the conditions of the methanol dissociation (equation 1) and of the methanol steam reforming (equation 4), so that the process can be guided simply, by varying the steam content of the methanol used, either in the direction of synthesis gas production or in the direction of hydrogen production, without having to replace the catalyst. Such a catalyst should have a high stability under varying process conditions and also should not cause coke deposition if no steam is added or if the steam content is low, i.e., under the conditions of the methanol dissociation according to equation (1).

The object of the invention is, accordingly, a catalyst for the production of synthesis gas or hydrogen from aqueous methanol by dissociation or steam reforming, which is characterized by:

(A) a metal component of one or more elements of the eighth subgroup of the periodic table on a carrier material on the basis ($B_1$) of $TiO_2$ or $CeO_2$, if necessary in admixture with other refractory heat-resistant metal oxides, and/or hydraulic binders or cements or ($B_2$) of $TiO_2$, that is introduced onto the surface of refractories pre-formed from $Al_2O_3$ or ceramic.

DESCRIPTION OF THE PREFERRED EMBODIMENT

The catalyst according to the invention makes it possible to carry out the process either under the conditions of the methanol dissociation (synthesis gas production) or under the conditions of methanol steam reforming (hydrogen production), whereby only the amount of added steam is varied. The catalyst according to the invention is stable under different process conditions and does not tend towards coking under the conditions of methanol dissociation.

Further, the catalyst according to the invention can also be used in the presence of oxygen, thus, under conditions under which the known copper catalysts are not stable. Since reactions (1) and (4) are endothermic, it is desirable in many cases to carry out the reactions in the presence of oxygen, so that an autothermic reaction process may be achieved.

For industrial use of the catalyst according to the invention, it is advantageous for the carrier material to be in shaped forms, such as tablets, spheres, rings, or honeycombs.

For the metal component, one or more precious metals from the eighth subgroup of the periodic table (group VIIIb) especially platinum, palladium, or rhodium may be used. Alloys of these metals can also be applied.

The precious metal concentration can be held proportionally low. Preferably the concentration is about 0.03-3 wgt.%, preferably 0.15-0.5 wgt.%, with reference to the total catalyst.

The concept "heat-resistant metal oxide or refractory" is to be taken in its broadest sense and includes mixed refractory metal oxides, spinels, metal aluminates and ceramics. $Al_2O_3$ and $Cr_2O_3$ are preferred heat-resistant metal oxides.

For increasing the stability of the catalyst, the $TiO_2$ or $CeO_2$ or a mixture of $TiO_2$ and $CeO_2$ and of other heat-resistant metal oxides can contain a hydraulic binder, such as calcium aluminate cement. The fraction of the calcium aluminate cement is in general 10–50 wgt.% preferably 25 wgt.% with reference to the total catalyst.

The catalysts according to the invention are generally produced as follows:

According to variant ($B_1$), shaped bodies, e.g. tablets, spheres on rings, are produced by pressing or extruding $TiO_2$ or $CeO_2$, if necessary in admixture with other heat-resistant metal oxides. Preferably, a hydraulic cement is added to the titania, or to the mixture of titania and other heat-resistant metal oxides, before tableting. Finally, water is added to the mixture, in order to activate the hydraulic cement, whereupon the shaped bodies are produced by tableting. These are dried and, if necessary, hardened with steam, calcined and thereafter impregnated with the catalytically active metal component.

In order to facilitate the tableting, a lubricant, such as aluminum stearate and/or graphite, is added to the mass to be tableted.

According to variant ($B_2$), titanium dioxide is introduced onto the surface of a pre-formed, "inert" refractory or heat-resistant material, such as $Al_2O_3$, or ceramic, whereupon the so-treated shaped body is calcined and impregnated with the precious metal component. Pre-formed refractory ceramics include ceramic honeycombs in normal commercial usage, which excel in high stability. The ceramic material can be, for example, of cordierite or mullite. However, commercially available ceramic spheres and rings can also be used as pre-formed shaped bodies.

In order to incorporate the titanium dioxide onto the pre-formed shaped refractories, the shaped refractories are preferably impregnated with alkoxytitanates, such as tetraisopropyltitanate $((CH_3)_2CHO)_4Ti)$ or tetra-n-butyltitanate $((n-C_4H_8O)_4Ti)$. The alkoxytitanates are thereafter hydrolyzed with steam and calcined.

According to both process variants, the impregnation of the carrier material with the metal component is carried out with the use of water-soluble precious metal salts, especially $H_2PtCl_6$ or $(NH_4)_2PtCl_6$ or the corresponding Pd- or Rh-salts. The so-produced catalyst precursor is then dried and calcined. The calcination of the impregnated carrier material is usually carried out at 450°–650° C., preferably at 550°–640° C.

In order to obtain the corresponding precious metals from the precious metal salts, the calcined catalyst precursor is activated by reduction with hydrogen. The reduction or activation can be done immediately after the calcination or in the reactor before start-up.

The subject of the invention is also the use of the previously described catalysts for the production of synthesis gas or hydrogen from aqueous methanol by dissociation or steam reforming. As is evident from equations (1) and (4), dissociation of methanol takes place in the abence of steam, while steam reforming according to equation (4) takes place in the presence of steam. Depending on the water content of the methanol, the process can be simply guided so that either one or the other reacton predominates.

If pure hydrogen, according to equation (4), or a synthesis gas with an excess of hydrogen is to be produced, the carbon dioxide formed according to equation (4) is removed from the gas mixture in a known manner.

In general, the conversion of the aqueous methanol takes place in the temperature range of about 300°–600° C., under atmospheric or lower pressure, whereby a space velocity of 0.05–20 liter/h.liter catalyst, with reference to the aqueous methanol, is used. Preferably, the conversion is carried out in the temperature range of 400°–500° C. at pressures of 0.1–1 bar, especially 0.75–1 bar, starting from methanol with a water content of 0.5–25 vol.%, preferably 2–10 vol.% at a space velocity of 2–8 liter/h.liter catalyst, with reference to the aqueous methanol.

The trials given in the following examples were carried out in a conventional metal tubular reactor (fixed bed flow system) with tabletted (4×4 mm) catalyst (50 ml) or with ceramic honeycombs (diameter 17 mm, length 150 mm) at atmospheric pressure in the temperature range of 300°–500° C. The methanol contained 1–68 vol.% steam. The space velocity was 1–10 liter/h.-liter catalyst. The gases formed by the methanol dissociation were measured with the help of a gas meter and analyzed by gas chromatography.

The un-decomposed methanol or a mixture of methanol and water were condensed in a cooler, measured and analyzed by gas chromatography.

The invention is illustrated by the following examples, with reference to a comparison-catalyst, in a non-limiting fashion.

COMPARISON EXAMPLE 50 ml (58.6 g; 6.3×3.2 mm tablets) of a commercial, pre-reduced low-temperature water-gas shift catalyst (CC-1) (CuO about 35 wgt.%, ZnO about 65 wgt.%) were activated for three hours at 300° C. with hydrogen (50 liter/h) in a fixed bed flow reactor. The methanol dissociation (without $H_2O$) is then carried out, with a liquid hourly space velocity of 2 liter methanol/h.liter catalyst, at 300°, 350° and 400° C. The methanol to be dissociated contained 2.2 vol.% $H_2O$. The gas liberated by the catalytic reaction was measured and analyzed by gas chromatography (see Table II).

EXAMPLE 1

Commercial $TiO_2$ (BET surface area=45 m²/g) was formed into 4.5×4.5 mm tablets after the addition of 8 wgt.% Al-stearate as a lubricant or tableting aid. These tablets were heated up to 640° C. in air for 8 hours, then held at 640° C. for 1 hour and then cooled down again to room temperature. After impregnation with an aqueous $H_2PtCl_6$ solution (at 25° C.), the Pt-containing tablets were dried (4 hours at 120° C.) and calcined at 400° C. (2 hours). The resulting catalyst (C-1) contained 0.3 wgt.% Pt, and its physical-mechanical data are given in Table I.

50 ml (75.3 g) of catalyst C-1 were heated for 3 hours at 400° C. in a stream of hydrogen (50 liter/h) in a fixed bed flow reactor. After cooling to 300° C., the methanol dissociation was begun in a way analogous to the comparison example. The results are given in Table II.

EXAMPLE 2

Commercial $TiO_2$ (BET surface area=45 $m^2/g$) was first dry mixed with 25% calcium aluminate cement, then mix mulled after the addition of 60% $H_2O$ (with reference to the amount introduced). Shortly before the end of the mixing procedure, 3% of electro graphite was added. The wet mass was laid out in a thin layer and dried with air, until a loss due to drying (DL) at 120° C. of 8–12% was reached. Then this mass was pressed into cylindrical tablets of 4.5 mm diameter and 4.5 mm height. The tablets were cured in a closed container for 4 days and then steam-treated in an autoclave at 5.5 bar and 155° C. for 12 hours. Subsequently, the tablets were left lying out for a day and finally heated up to 640° C. within 3 hours and held at 640° C. for 1 hour. After cooling, the tablets were impregnated with an aqueous $H_2PtCl_6$ solution, then dried at 120° C. (4 hours) and recalcined at 400° C. (2 hours). The catalyst (C-2) thus obtained contained 0.3 wgt.% Pt, and its physical-mechanical data are given in Table I. 50 ml (56.6 g) of catalyst C-2 were heated up to 400° C. by treatment for 3 hours in a stream of hydrogen (50 liter/h) in a fixed bed flow reactor. Ater cooling to 300° C., a methanol dissociation analogous to that of the comparison example was carried out.

The results are given in Table II.

EXAMPLE 2a

The production of the catalyst followed the procedure described in Example 2; however, instead of impregnating with Pt from the $H_2PtCl_6$ solution, an aqueous solution of $(NH_4)_2PtCl_6$, with a pH of 10, was used.

The resulting catalyst (C-2a) contained 0.3 wgt.% Pt; its physical-mechanical data are given in Table I.

50 ml (59.0 g) of catalyst C-2a were activated by reduction with hydrogen as in Example 1 and a methanol dissociation carried out.

The results are given in Table III.

EXAMPLE 3

The production of the catalyst followed as described in Example 1. For the precious metal impregnating solution, however, a hydrochloric aqueous solution of $PdCl_2$ was used instead of the $H_2PtCl_6$ solution.

The resulting catalyst (C-3) contained 0.3 wgt.% Pd; its physical-mechanical data are presented in Table I.

50 ml (76.3 g) of catalyst C-4 were reduced with hydrogen as in Example 1 and methanol dissociation carried out.

The results are given in Table IV.

EXAMPLE 4

The production of the catalyst followed the procedure described in Example 1. For the precious metal impregnating solution, however, a aqueous solution of $H_2RhCl_6$ was used instead of the $H_2PtCl_6$ solution.

The thus-obtained catalyst (C-4) contained 0.3 wgt.% Rh; its physical-mechanical data are given in Table I.

50 ml (71.2 g) of catalyst C-4 were reduced with hydrogen as in Example 1 and methanol dissociation carried out.

The results are given in Table IV.

EXAMPLE 5

The production of the catalyst followed the procedure described as in Example 1. For the platinum impregnating solution, however, an aqueous solution of $H_2PtCl_6$ that was only half as concentrated as the one in Example 1 was used. The resulting catalyst (C-5) contained 0.15 wgt.% Pt; its physical-mechanical data are given in Table I.

50 ml (69.3 g) of catalyst C-6 were reduced with hydrogen as in Example 1 and methanol dissociation carried out.

The results are given in Table V.

EXAMPLE 6

The production of the catalyst followed the procedure described in Example 1. For the platinum impregnating solution, however, an aqueous solution of $H_2PtCl_6$ that was only one-fourth as concentrated as that in Example 1 was used.

The resulting catalyst (C-6) contained 0.075 wgt.% Pt; its physical-mechanical data are given in Table I.

50 ml (70.5 g) of catalyst C-6 were reduced and activated with hydrogen as in Example 1 and methanol dissociation carried out.

The results are given in Table V.

EXAMPLE 7

Commercial $CeO_2$ (BET SA=43 $m^2/g$) was formed into 4.5×4.5 mm tablets after the addition of 8 wgt.% Al-stearate. These tablets were heated to 640° C. for 1 hour, then cooled again to room temperature. After impregnation with an aqueous $H_2PtCl_6$ solution (at 25° C.), the Pt-containing tablets were dried (120° C., 4 hours) and calcined at 400° C. (2 hours). The resulting catalyst (C-7) contained 0.3 wgt.% Pt. Its physical-mechanical data are given in Table I.

50 ml (92.5 g) of catalyst C-7 were heated to 400° C. and reduced for 3 hours in a stream of hydrogen (50 liter/hour) in a fixed bed flow reactor. After cooling to 300° C., methanol dissociation was begun as in the comparison example. The results are given in Table II.

EXAMPLE 8

A commercial ceramic honeycomb refractory with square openings of 1.5 mm side length was immersed at room temperature in tetraisopropyltitanate (TIPT) for 30 minutes.

The refractory carrier was then steam-treated in an autoclave at 5.5 bar and 155° C. for 12 hours for hydrolysis of the TIPT. It then was calcined in a muffle-furnace at 600° C. (2 hours); the ceramic honeycomb carrier contained 6 wgt.% $TiO_2$ after this treatment.

For impregnation with Pt, the $TiO_2$-containing carrier was soaked with an aqueous solution of $H_2PtCl_6$, carefully dried, and recalcined at 400° C. (2 hours).

The resulting catalyst (C-8) contained 0.3% Pt; its physical-mechanical data are given in Table I.

50 ml (17.9 g) of catalyst C-8 were reduced with hydrogen as described in Example 1 and methanol dissociation was carried out.

The results are give in Table VI.

TABLE I

| Cat. No. | Form | Physical-Mechanical Data | | | | Composition (Weight %) |
|---|---|---|---|---|---|---|
| | | BET-SA (m²/g) | BD (g/l) | CS (kg) | PV (ml/g) | |
| CC-1 | 6 × mm Tabl. | 49 | 1146 | 8.1 | 0.24 | CuO (35) ZnO (65) |
| C-1 | 4.5 × 4.5 mm Tabl. | 40 | 1426 | 17.3 | 0.13 | $TiO_2$ |
| C-2 | 4.5 × 4.5 mm Tabl. | 15 | 1131 | 39.0 | 0.22 | $TiO_2$ (75) Ca—Al—Cement |
| C-2a | 4.5 × 4.5 mm Tabl. | 48 | 1180 | 34.5 | 0.20 | $TiO_2$ (75) Ca—Al—Cement |
| C-3 | 4.5 × 4.5 mm Tabl. | 19 | 1525 | 24.6 | 0.13 | $TiO_2$ |
| C-4 | 4.5 × 4.5 mm Tabl. | 21 | 1423 | 15.1 | 0.16 | $TiO_2$ |
| C-5 | 4.5 × 4.5 mm Tabl. | 20 | 1385 | 20.4 | 0.19 | $TiO_2$ |
| C-6 | 4.5 × 4.5 mm Tabl. | 20 | 1410 | 20.3 | 0.15 | $TiO_2$ |
| C-7 | 4.5 × 4.5 mm Tabl. | 47 | 1850 | 12.5 | 0.12 | $CeO_2$ |
| C-8 | Ceramic Honeycombs | 8 | 358 | — | 0.14 | $TiO_2$ (6.1) |

Notes:
BET-SA = Specific surface area according to BET method
BD = Specific weight
CS = Crush strength
PV = Pore volume measured by Hg porosimeter

TABLE II

Methanol Dissociation

| Catalyst | T °C. | Gas Amount 1/h (25° C.) | Composition (Vol. %) | | | | Condensate ml/h |
|---|---|---|---|---|---|---|---|
| | | | CO | $H_2$ | $CO_2$ | $CH_4$ | |
| CC-1 | 300 | 72 | 20.1 | 73.1 | 6.6 | 0.20 | 59 |
| | 350 | 125 | 27.1 | 68.4 | 4.1 | 0.34 | 30 |
| | 400 | 167 | 29.0 | 67.1 | 3.4 | 0.50 | 7 |
| C-1 | 300 | 85 | 26.7 | 66.4 | 4.4 | 2.5 | 52 |
| | 350 | 156 | 28.6 | 65.4 | 3.5 | 2.5 | 12 |
| | 400 | 181 | 28.5 | 65.1 | 3.4 | 3.0 | 0 |
| C-2 | 300 | 46 | 29.9 | 66.2 | 2.9 | 1.0 | 73 |
| | 350 | 95 | 30.0 | 66.6 | 2.4 | 1.0 | 46 |
| | 400 | 150 | 30.0 | 66.8 | 2.1 | 1.1 | 16 |
| C-3 | 300 | 84 | 18.1 | 72.9 | 7.2 | 1.8 | 52 |
| | 400 | 162 | 27.9 | 65.1 | 3.5 | 3.5 | 9 |
| C-7 | 300 | 64 | 25.6 | 71.0 | 3.0 | 0.4 | 63 |
| | 350 | 137 | 28.4 | 68.2 | 3.0 | 0.4 | 20 |
| | 400 | 182 | 29.1 | 67.8 | 2.6 | 0.5 | 0 |
| For 100% conversion | | 181.2 | 31.2 | 67.2 | 1.6 | — | — |

Cat: 50 ml, 4.5 × 4.5 mm Tablets,
Feed: Methanol with 2.2 Vol. % $H_2O$, 100 ml/h

TABLE III

Methanol Dissociation
(Comparison Between Catalysts Produced with $H_2PtCl_6$ or Pt-ammine Complex)

| Catalyst | T °C. | Gas Amount 1/h (25° C.) | Composition (Vol %) | | | | Condensate ml/h |
|---|---|---|---|---|---|---|---|
| | | | CO | $H_2$ | $CO_2$ | $CH_4$ | |
| C-2 | 300 | 46 | 29.9 | 66.2 | 2.9 | 1.0 | 73 |
| | 350 | 95 | 30.0 | 66.6 | 2.4 | 1.0 | 46 |
| | 400 | 150 | 30.0 | 66.8 | 2.1 | 1.1 | 16 |
| C-2a | 300 | 45 | 31.0 | 65.7 | 2.2 | 1.1 | 74 |
| | 350 | 85 | 31.0 | 65.7 | 2.1 | 1.2 | 51 |
| | 400 | 154 | 29.8 | 66.7 | 2.0 | 1.5 | 13 |
| C-3 | 300 | 84 | 18.1 | 72.9 | 7.2 | 1.8 | 52 |
| | 350 | 128 | 23.3 | 68.9 | 5.5 | 2.3 | 28 |
| | 400 | 162 | 27.9 | 65.1 | 3.5 | 3.5 | 9 |
| C-3a | 300 | 100 | 17.1 | 72.3 | 8.8 | 1.8 | 43 |
| | 350 | 149 | 22.1 | 69.2 | 6.5 | 2.2 | 16 |
| | 400 | 181 | 27.0 | 64.8 | 4.8 | 3.4 | 0 |
| For 100% conversion | | 181.2 | 31.2 | 67.2 | 1.6 | — | — |

Cat: 50 ml, 4.5 × 4.5 mm Tablets,
Feed: Methanol with 2.2 Vol. % $H_2O$, 100 ml/h

TABLE IV

Methanol Dissociation
(Comparison Between Pt-, Pd- and Rh-containing Catalysts)

| Catalyst | T °C. | Gas Amount 1/h (25° C.) | Composition (Vol. %) | | | | Condensate ml/h |
|---|---|---|---|---|---|---|---|
| | | | CO | $H_2$ | $CO_2$ | $CH_4$ | |
| C-1 | 300 | 85 | 26.7 | 66.4 | 4.4 | 2.5 | 52 |
| | 350 | 156 | 28.6 | 65.4 | 3.5 | 2.5 | 12 |
| | 400 | 181 | 28.5 | 65.1 | 3.4 | 3.0 | 0 |
| C-3 | 300 | 36 | 23.6 | 59.2 | 5.7 | 11.5 | 79 |
| | 350 | 102 | 24.9 | 57.0 | 6.0 | 12.1 | 42 |
| | 400[1] | 71 | 23.3 | 60.7 | 3.7 | 12.3 | 59 |

TABLE IV-continued
Methanol Dissociation
(Comparison Between Pt-, Pd- and Rh-containing Catalysts)

| Catalyst | T °C. | Gas Amount 1/h (25° C.) | Composition (Vol. %) CO | $H_2$ | $CO_2$ | $CH_4$ | Condensate ml/h |
|---|---|---|---|---|---|---|---|
| | 400[2] | 40 | 18.7 | 65.6 | 2.2 | 13.5 | 76 |
| C-4 | 300 | 58 | 24.1 | 66.1 | 6.1 | 3.7 | 66 |
| | 350 | 136 | 25.2 | 64.1 | 5.7 | 5.0 | 23 |
| | 400 | 181 | 24.2 | 63.6 | 6.5 | 5.7 | 0 |
| For 100% conversion | | 181.2 | 31.2 | 67.2 | 1.6 | — | — |

[1] 2h running time
[2] 3½ h running time, instable
Cat: 50 ml, 4.5 × 4.5 mm tablets,
Feed: Methanol with 2.2 Vol. % $H_2O$, 100 ml/h

TABLE V
Methanol Dissociation
(Effect of the Pt- Concentration)

| Catalyst | T °C. | Gas Amount 1/h (25° C.) | Composition (Vol. %) CO | $H_2$ | $CO_2$ | $CH_4$ | Condensate ml/h |
|---|---|---|---|---|---|---|---|
| C-1 | 300 | 85 | 26.7 | 66.4 | 4.4 | 2.5 | 52 |
| | 350 | 156 | 28.6 | 65.4 | 3.5 | 2.5 | 12 |
| | 400 | 181 | 28.5 | 65.1 | 3.4 | 3.0 | 0 |
| C-5 | 300 | 85 | 27.3 | 66.5 | 4.0 | 2.2 | 51 |
| | 350 | 155 | 29.5 | 65.6 | 2.7 | 2.2 | 13 |
| | 400 | 181 | 29.2 | 65.5 | 2.9 | 2.4 | 0 |
| C-6 | 300 | 61 | 28.7 | 65.6 | 3.7 | 2.0 | 65 |
| | 350 | 128 | 30.6 | 65.2 | 2.3 | 1.9 | 28 |
| | 400 | 181 | 30.7 | 64.9 | 2.2 | 2.2 | 0 |
| For 100% conversion | | 181.2 | 31.2 | 67.2 | 1.6 | — | — |

Cat.: 50 ml, 4.5 × 4.5 mm tablets,
Feed: Methanol with 2.2 Vol. % $H_2O$, 100 ml/h

TABLE VI
Methanol Dissociation
(Comparison Between Different Catalyst Forms)

| Catalyst | T °C. | Gas Amount 1/h (25° C.) | Composition (Vol. %) CO | $H_2$ | $CO_2$ | $CH_4$ | Condensate ml/h |
|---|---|---|---|---|---|---|---|
| C-1 | 300 | 85 | 26.7 | 66.4 | 4.4 | 2.5 | 52 |
| (Tablets) | 350 | 156 | 28.6 | 65.4 | 3.5 | 2.5 | 12 |
| | 400 | 181 | 28.5 | 65.1 | 3.4 | 3.0 | 0 |
| C-8 | 300 | 33 | 33.0 | 65.3 | 0.6 | 1.1 | 80 |
| (Ceramic | 350 | 73 | 32.9 | 65.2 | 0.6 | 1.3 | 58 |
| Honeycombs) | 400 | 120 | 32.7 | 65.1 | 0.7 | 1.5 | 32 |
| C-10 | 300 | 46 | 26.1 | 72.2 | 0.6 | 1.1 | 73 |
| (Spheres) | 350 | 92 | 27.3 | 70.6 | 0.9 | 1.2 | 48 |
| | 400 | 133 | 29.3 | 68.1 | 1.0 | 1.6 | 25 |
| C-11 | 300 | 59 | 31.2 | 66.3 | 0.7 | 1.8 | 66 |
| (Spheres) | 350 | 125 | 30.9 | 66.2 | 1.0 | 1.9 | 29 |
| | 400 | 169 | 31.2 | 65.1 | 1.5 | 2.2 | 5 |
| For 100% conversion | | 181.2 | 31.2 | 67.2 | 1.6 | — | — |

Catalyst: 50 ml
Feed: Methanol with 2.2 Vol. % $H_2O$, 100 ml/h

TABLE VII
Methanol Dissociation
(Effect of the Methanol Space Velocity)

| LHSV | T °C. | Gas Amount 1/h (25° C.) | Composition (Vol. %) CO | $H_2$ | $CO_2$ | $CH_4$ | Condensate ml/h |
|---|---|---|---|---|---|---|---|
| 2 | 300 | 85 | 27.3 | 66.5 | 4.0 | 2.2 | 51 |
| 2 | 350 | 155 | 29.5 | 65.6 | 2.7 | 2.2 | 13 |
| 2 | 400 | 181 | 29.2 | 65.5 | 2.9 | 2.4 | 0 |
| 100% conversion | | 181.2 | 31.2 | 67.2 | 1.6 | — | — |
| 4 | 400 | 283 | 31.3 | 64.7 | 1.9 | 2.1 | 20 |
| For 100% conversion | | 362.4 | 31.2 | 67.2 | 1.6 | — | — |

Catalyst: C-6, 50 ml, 4.5 × 4.5 mm tablets,
Feed: Methanol with 2.2 Vol. % $H_2O$, 100 ml/h

TABLE VIII

Methanol Dissociation and Reforming
(Effect of the Water Content in the Methanol
on the Gas Composition and the Gas Amount Obtained)

| H$_2$O Content In Methanol (Vol. %) | T °C. | Gas Amount 1/h (25° C.) | Composition (Vol. %) CO | H$_2$ | CO$_2$ | CH$_4$ | Condensate ml/h | H$_2$O content (%) |
|---|---|---|---|---|---|---|---|---|
| 2.0 | 350 | 156 | 28.6 | 65.4 | 3.5 | 2.5 | 12 | 23.0 |
| (H$_2$O/CH$_3$OH mol. ratio = 0.04) | 400 | 181 | 28.5 | 65.1 | 3.4 | 3.0 | — | — |
| 41.3 | 350 | 131 | 9.4 | 72.0 | 17.5 | 1.1 | 25 | 86.0 |
| (H$_2$O/CH$_3$OH mol. ratio = 1.56) | 400 | 145 | 7.4 | 73.2 | 18.4 | 1.0 | 22 | 98.0 |
| 68.0 | 350 | 78.0 | 1.8 | 75.4 | 22.5 | 0.3 | 53 | 99.9 |
| (H$_2$O/CH$_3$OH mol. ratio = 4.73) | 400 | 78.2 | 1.5 | 75.1 | 22.8 | 0.6 | 54 | 100.0 |

Catalyst: C-1, 50 ml, 4.5 × 4.5 mm tablets,
LHSV = 2 (CH$_3$OH + H$_2$O)

We claim:

1. A catalyst for the production of synthesis gas or hydrogen from aqueous methanol, which comprises:
   A. a catalytically-active Group VIII precious metal component;
   B. a carrier comprising:
      1. a metal oxide or a mixture of metal oxides, wherein the metal is selected from the group consisting of cerium and titanium in admixture with chromium oxide.

2. A catalyst, as defined in claim 1, comprising a set hydraulic cement as an additional component.

3. A catalyst, as described in claim 1, in which the carrier material is in the form of tablets, spheres, rings or honeycombs.

4. A catalyst, as defined in claim 1, in which the catalytically-active metal component includes a precious metal selected from the group consisting of platinum, palladium and rhodium.

5. A catalyst, as described in claim 1, in which the precious metal concentration is from about 0.03 to 3.0% by weight, based on the weight of the total catalyst.

6. A catalyst, as defined in claim 2, in which said hydraulic cement is calcium aluminate.

7. A catalyst, as defined in claim 2, in which said hydraulic cement is present in a concentration of about 10 to 50% by weight, based on the weight of the total catalyst.

8. A process for the production of a catalyst for the production of synthesis gas or hydrogen from aqueous methanol which comprises the steps of:
   A. mixing at least one metal oxide selected from the group consisting of titanium oxide and cerium oxide with chromium oxide and forming the mixed oxides into shaped catalyst bodies;
   B. calcining said catalyst bodies;
   C. impregnating said catalyst bodies with a solution of a soluble Group VIII precious metal compound and
   D. calcining said impregnated catalyst bodies.

9. A process as defined in claim 8, in which said chromium oxide is mixed with a hydraulic cement, and water is added to the admixture prior to forming the admixture into shaped catalyst bodies.

10. A process, as defined in claim 8, the improvement of adding a lubricant to the admixture prior to forming the admixture into shaped catalyst bodies.

11. A process, as defined in claim 8, in which the impregnating solution is that of a water-soluble precious metal salt.

* * * * *